Figure 1:
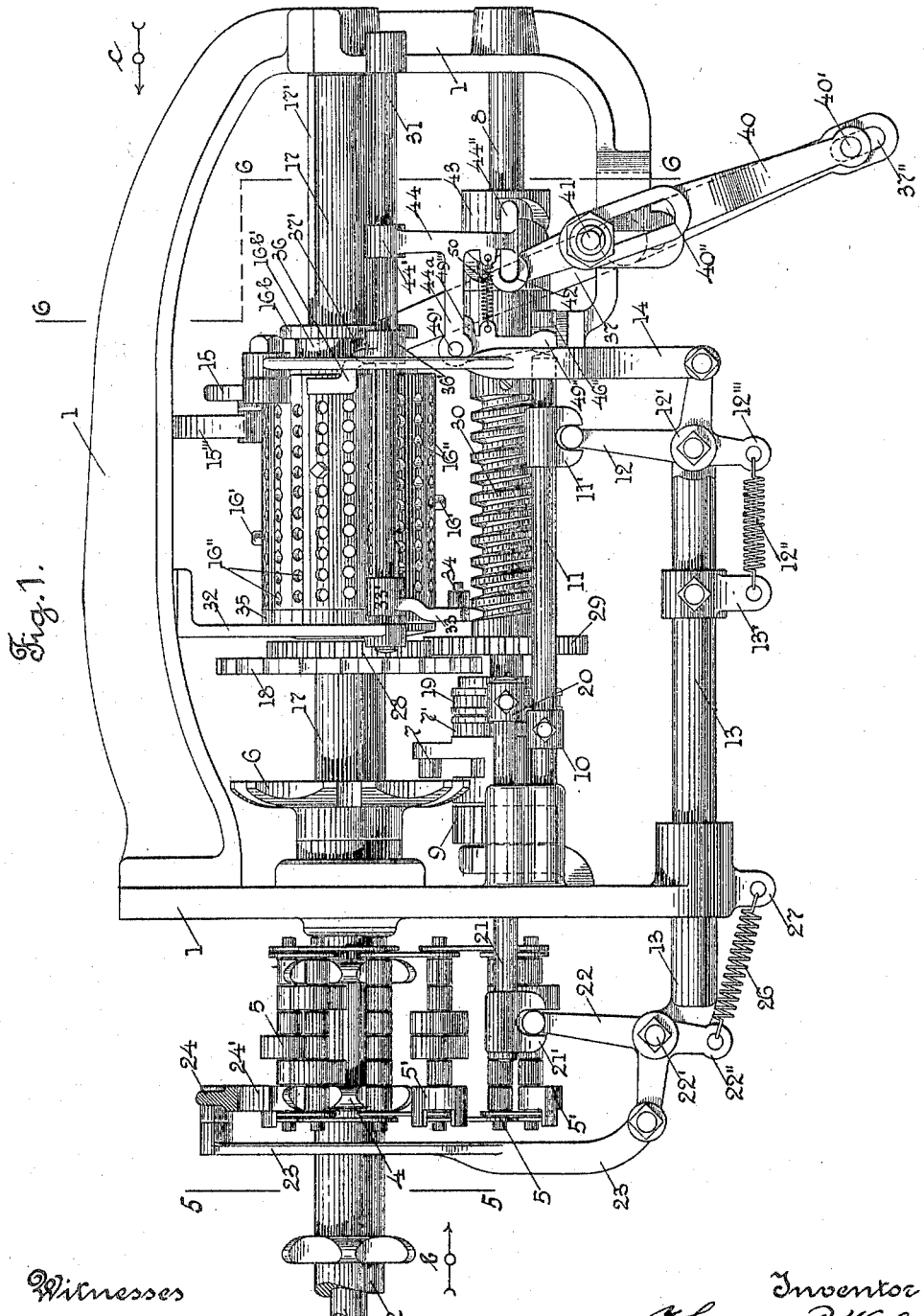

No. 821,321. PATENTED MAY 22, 1906.
T. P. WALSH.
LOOM MULTIPLIER MECHANISM.
APPLICATION FILED MAY 16, 1904.

4 SHEETS—SHEET 1.

Witnesses
M. Bredt.
M. Coas.

Inventor
Thomas P. Walsh
By John C. Dewey
Attorney.

No. 821,321. PATENTED MAY 22, 1906.
T. P. WALSH.
LOOM MULTIPLIER MECHANISM.
APPLICATION FILED MAY 16, 1904.
4 SHEETS—SHEET 2.
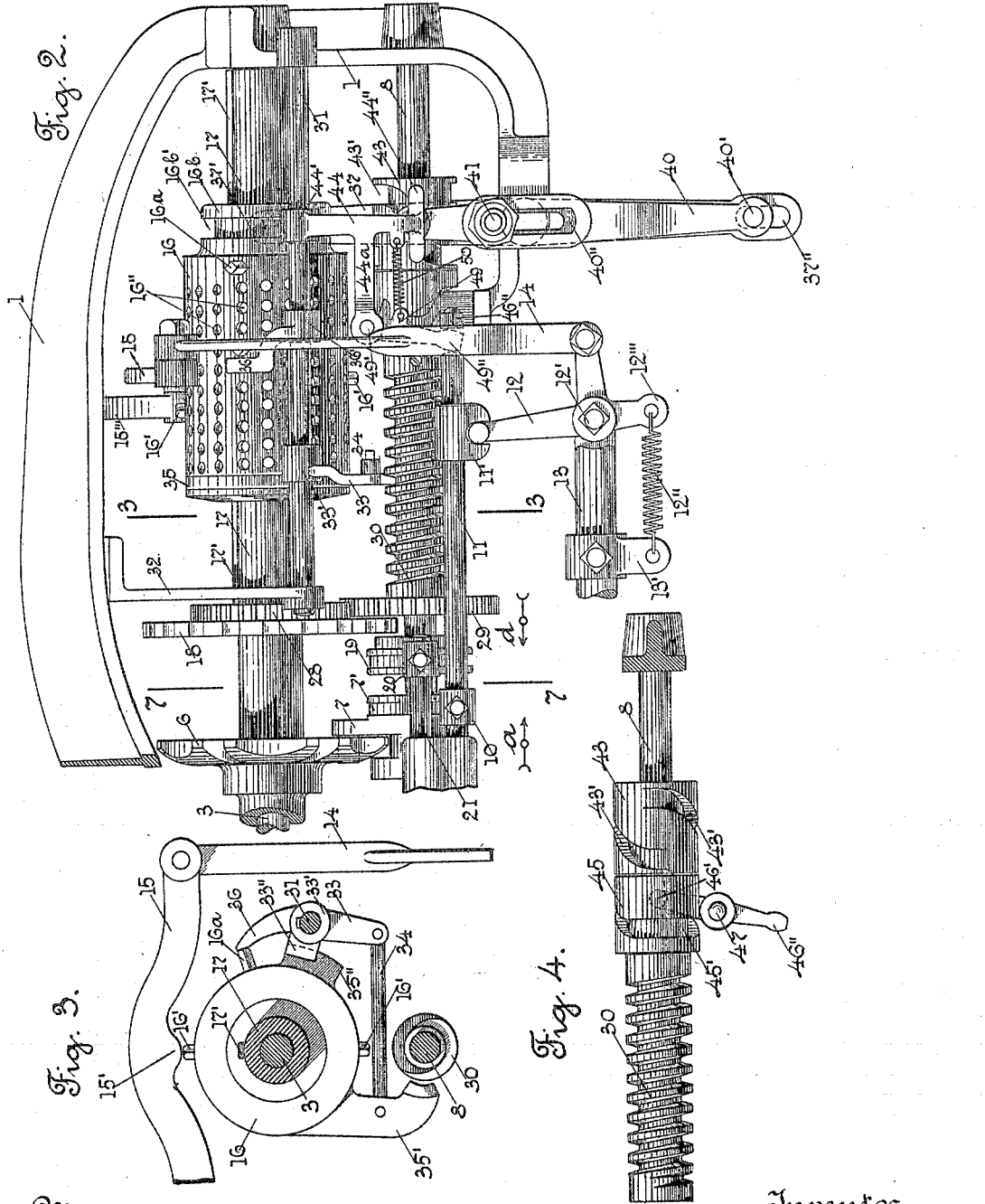
Witnesses
M. Bredt.
M. Haas.
Inventor
Thomas P. Walsh
By John C. Dewey.
Attorney.

No. 821,321. PATENTED MAY 22, 1906.
T. P. WALSH.
LOOM MULTIPLIER MECHANISM.
APPLICATION FILED MAY 16, 1904.

4 SHEETS—SHEET 3.

Witnesses
M. Bredt.
M. Haas.

Inventor
Thomas P. Walsh
By John C. Dewey.
Attorney.

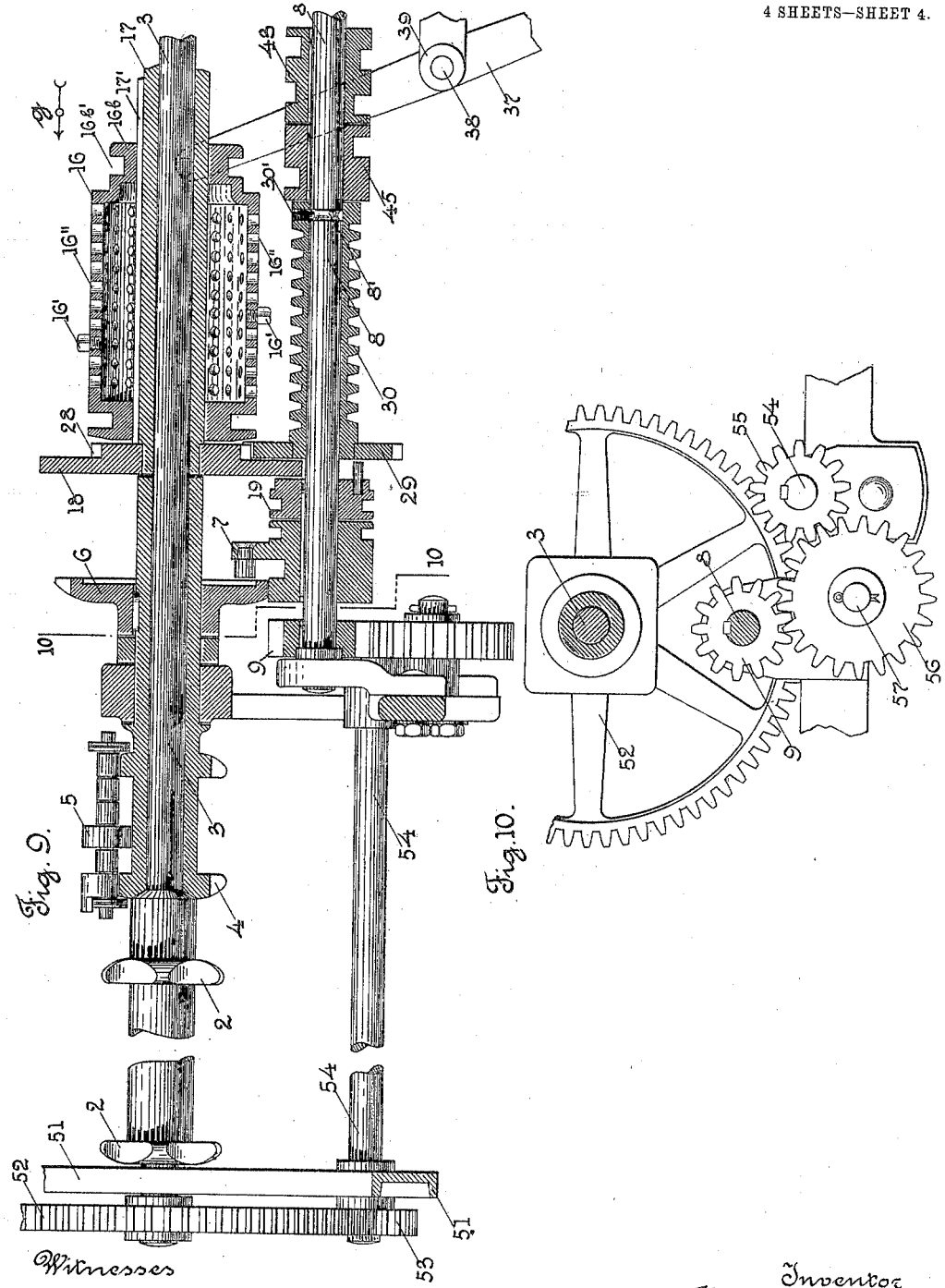

UNITED STATES PATENT OFFICE.

THOMAS P. WALSH, OF WORCESTER, MASSACHUSETTS, ASSIGNOR TO CROMPTON & KNOWLES LOOM WORKS, A CORPORATION OF MASSACHUSETTS.

LOOM-MULTIPLIER MECHANISM.

No. 821,321.     Specification of Letters Patent.     Patented May 22, 1906.

Application filed May 16, 1904. Serial No. 208,098.

*To all whom it may concern:*

Be it known that I, THOMAS P. WALSH, a citizen of the United States, residing at Worcester, in the county of Worcester and State of Massachusetts, have invented certain new and useful Improvements in Loom-Multiplier Mechanism, of which the following is a specification.

My invention relates to loom-multipliers, by means of which certain bars of the shuttle-box pattern-chain may be repeated without making successive similar bars; and my invention particularly relates to that class of loom-multipliers shown and described in United States Letters Patent No. 413,369, of October 22, 1889.

The object of my invention is to make an improved multiplier mechanism of the class referred to and more particularly to substitute for the ordinary multiplier pattern-chain a pattern-surface consisting of a cylinder or drum provided with parallel rows of holes extending in the direction of the length of the drum and also around the circumference thereof, said holes adapted to receive pins as pattern-indicating surfaces, according to the pattern to be woven. Said multiplier pattern-drum is adapted to have a rotary motion and also a longitudinal motion to bring the pattern-pins thereon into operative position to act on a lever and through intermediate connections to rotate the box pattern-chain, as desired.

My invention consists in certain novel features of construction of my improvements, as will be hereinafter fully described.

I have only shown in the drawings sufficient parts of a shuttle-box pattern-chain and operating mechanism of the class shown and described in said Patent No. 413,369, with my improvements combined therewith, sufficient to enable those skilled in the art to make and use the same.

Figures 5, 6, 7, 8:
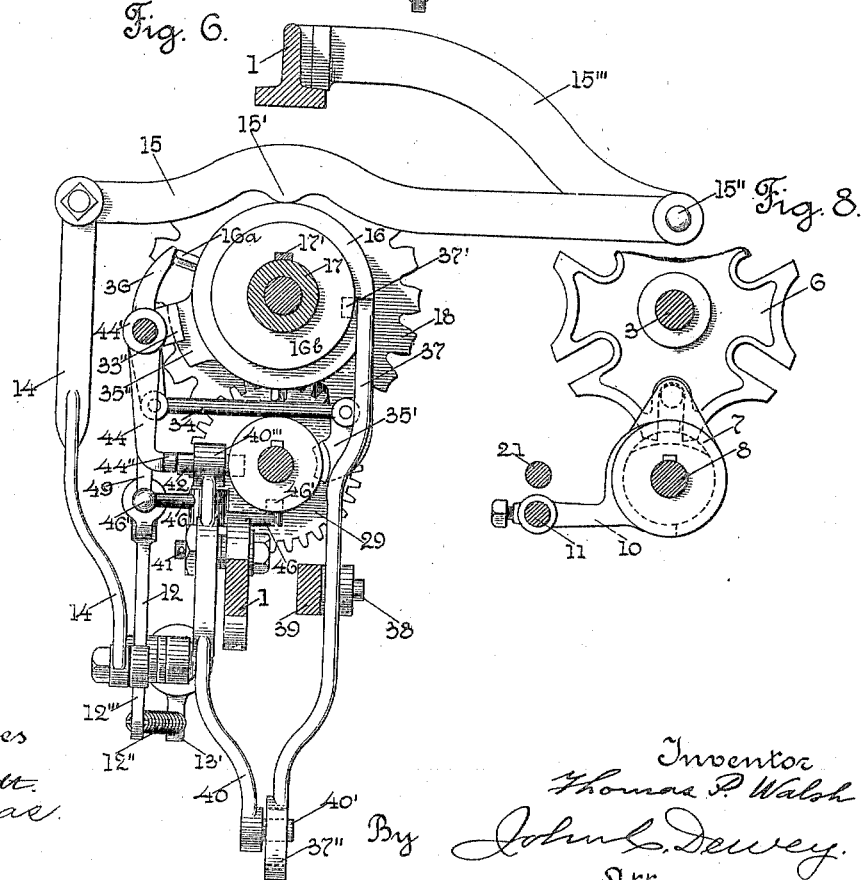

Referring to the drawings, Figure 1 is a side view of a loom-multiplier embodying my improvements. Fig. 2 corresponds to Fig. 1, but with some of the parts shown in Fig. 1 left off and other parts shown in a different position, the pattern-drum being in its intermediate position. Fig. 3 is a sectional detail taken at a point indicated by line 3 3, Fig. 2, looking in the direction of arrow *a*, same figure. Fig. 4 is a detached plan view of the worm and cam-collars on the driven shaft and a lever engaging one of said collars. Fig. 5 is a sectional detail taken at a point indicated by line 5 5, Fig. 1, looking in the direction of arrow *b*, same figure. Fig. 6 is a cross-section on line 6 6, Fig. 1, looking in the direction of arrow *c*, same figure. Fig. 7 is a sectional detail on line 7 7, Fig. 2, looking in the direction of arrow *a*, same figure, and showing the star-wheel and pin-wheel for turning the multiplier pattern-drum. Fig. 8 is a sectional detail on line 7 7, Fig. 2, looking in the direction of arrow *d* and showing the star-wheel and pin-wheel for turning the shuttle-box pattern-chain. Fig. 9 is a longitudinal sectional view through a portion of the mechanism shown in Fig. 1 and also shows the harness pattern-cylinder and driving-gears; and Fig 10 is a cross-section on line 10 10, Fig 9, looking in the direction of arrow *g*, same figure, showing the gear-driving mechanism.

In the accompanying drawings, 1 is the stand or frame for supporting the several parts of the shuttle-box pattern mechanism. 2 is a portion of the harness pattern-barrel fast on the shaft 3, which carries a gear (not shown) driven by a set of reverse-gears (not shown) in the ordinary way and as set forth in said Patent No. 413,369.

4 is the shuttle-box pattern-barrel carrying the shuttle-box pattern-chain 5, made up of bars linked together, and carrying rolls and tubes in the ordinary way. Extending over the shuttle-box pattern-chain 5 are indicator-levers (not shown) for transmitting the indications of the pattern-chain to the box-shifting mechanism in the usual manner.

The pattern-barrel 4 is loosely mounted on the shaft 3 and is connected with the hub of the star-wheel 6, which is rotated in the usual way by the pin-wheel 7, mounted to rotate with and slide on a shaft 8, having a gear 9 fast thereon, to which is communicated a regular rotary motion through intermediate gears (not shown) from the gear (not shown) on the shaft 3, as shown and described in said Patent No. 413,369.

The hub 7' of the pin-wheel 7 has an annular groove therein to receive the forked end of an arm 10, fast on the sliding rod 11. Motion is communicated to the sliding rod 11 to carry the pin-wheel 7 into and out of engagement with the star-wheel 6 to rotate the box pattern-chain 5 or to leave it at rest in the manner similar to what is shown and described in said Patent No. 413,369—that is, by means of an angle-lever 12, pivoted on a stud 12' on the stationary rod 13 and having one arm engaging a block 11', fast on the sliding rod 11, and the other arm pivotally connected to the lower end of a link 14. A spring 12'', attached to a projection 12''' on the angle-lever 12 and to a collar 13' on the rod 13, acts to move the rod 11 in one direction in the usual way. The upper end of the link 14 is pivotally connected to a lever 15, which extends over and has a projection 15' thereon, adapted to be engaged by the pattern-pins 16' on the multiplier pattern-drum 16, as shown in Fig. 3. The lever 15 may be termed an "indicator-lever" and is pivotally attached by a pin 15'' to the end of arm 15''', secured to the top part of the stand 1.

The multiplier pattern-drum 16 has a series of parallel rows of holes 16'', extending in the direction of the length of the cylinder 16 and also in a spiral line around the circumference thereof. There may be more or less rows of holes in the pattern-cylinder 16, as desired. In this instance there are twenty longitudinal rows of holes, each row having ten holes therein, making two hunderd holes to receive the pattern-pins 16'. The pattern-pins 16' are arranged on the pattern-drum 16 according to the pattern to be woven. The pattern-drum 16 is mounted on a sleeve 17, loose on the shaft 3, and is splined on said sleeve by a spline 17' to have a rotary motion therewith and a sliding motion thereon. Fast on the sleeve 17 is a star-wheel 18, which is operated by a pin-wheel 19, which is splined on the shaft 8 to have a rotary motion on said shaft and a sliding motion thereon. The pin-wheel 19 carries in this instance a single pin 19' to engage the recesses 18' in the star-wheel 18. (See Fig. 7.) The pin-wheel 19 has an annular groove in its periphery to receive the forked end 20' of the arm 20, fast on a sliding rod 21. Sliding motion is communicated by the sliding rod 21 to the pin-wheel 19 through angle-lever 22, pivoted at 22' on the end of the rod 13. One arm of the angle-lever 22 engages the block 21', fast on the rod 21, and the other arm of the angle-lever 22 is pivotally attached to a link 23. The upper end of said link 23 is pivotally attached to an indicator-lever 24, which is pivotally mounted on a rod 25 and has a foot 24' thereon which extends over and is adapted to engage a series of pattern-indicators 5', carried on the pattern-chain 5. (See Figs. 1 and 5.) A spring 26, connected at one end to a projection 22' on the angle-lever 22 and at its other end to an ear 27, acts to move the angle-lever 22 and the sliding rod 21 in the usual way to disengage the pin-wheel 19 from the star-wheel 18 when the pattern-indicator 5' passes from under the foot 24' on the lever 24. A gear 28 is fast to the star-wheel 18 or connected therewith and engages a gear 29, loose on the shaft 8. Connected with the gear 29 is a worm 30, loosely mounted on the shaft 8.

I will now describe the mechanism for communicating a longitudinal motion to the multiplier pattern-drum 16 through the rotation of the worm 30.

A rocker-shaft 31 is mounted in suitable bearings on the bracket 32 and frame 1, respectively. An arm 33 has a hub 33' splined on the shaft 31 to rock therewith and to slide thereon, (see Fig. 3,) and the lower end of the arm 33 is pivotally connected by link 34 with an arm 35', which extends down from a collar or ring 35, loosely mounted in an annular recess in the periphery of the multiplier pattern-drum 16 at one end thereof. (See Fig. 2.) The ring 35 and arm 35' have a longitudinal motion with the drum 16; but the ring 35 has a rotary motion independent of said drum, so that the end of the arm 35' may be moved into engagement with the worm 30, as shown in Fig. 6, to communicate longitudinal motion to the drum 16 in one direction through the revolution of the worm 30, or be moved out of engagement with the worm 30, as shown in Fig. 3, to allow of the longitudinal motion of the drum 16 in the opposite direction in the manner to be hereinafter described. The rotary movement of the ring 35, carrying the arm 35', is very slight, only sufficient to move the end of the arm 35' into and out of engagement with the worm 30. In order to keep the hub 33' of the arm 33 in proper position relatively to the ring 35 on the drum 16 and the arm 35', I provide a lip or extension 33'' on the inner end of the hub 33', which has a recess therein to receive an extension 35'' on the ring 35. (See Figs. 3 and 6.) By this construction the ring 35 is free to rotate and acts to move the hub 33' longitudinally on the rod 31. The movement of the arm 35' on the ring 35 out of engagement with the worm 30 is controlled by a longer pattern-pin, as 16$^a$, on the end of the pattern-drum 16, (see Figs. 2, 3, and 6,) which in the revolution of the drum 16 and when the drum reaches its extreme left position (shown in Fig. 1) is adapted to engage an arm 36, having a hub 36', fast on the rock-shaft 31. The engagement of the longer pin 16$^a$ with the arm 36 rocks the shaft 31 and through arm 33 and link 34 moves the arm 35' on the ring 35 out of engagement with the worm 30 by rotating the ring 35. (See Fig. 3.) The drum 16 is now free to return to its extreme right position.

I will now describe the mechanism for moving the drum 16 to the right on the sleeve 17. An extension 16$^b$ on the right end of the drum 16 has an annular groove 16$^{b'}$ therein which receives a pin 37′ on the upper end of a lever 37, pivoted on a stud 38 on the bar 39. (See Fig. 6.) The lower end of the lever 37 has a slot 37″ therein to receive a pin 40′ in the lower end of a lever 40. The lever 40 has a slot 40″ therein, through which extends a bolt 41, secured in the lower part of the frame 1, (see Fig. 6,) which pivotally supports the lever 40. On the upper end of the lever 40 is a hub 40‴, having loosely mounted therein a pin 42, which at its inner end is adapted to enter a cam-groove 43′ in a collar 43 on the shaft 8. Fast on the rocker-shaft 31 is the hub 44′ of a downwardly-extending arm 44, which has a widened end 44″, which extends in front of the pin 42. (See Figs. 2 and 6.) When the shaft 31 is rocked, through a longer pin 16$^a$ engaging the arm 36, the lower end 44″ of the arm 44 will be moved in to force the pin 42 into the cam-groove 43′ in the collar 43, so that the revolution of said collar with the shaft 8 will rock the lever 40 and with it the lever 37 and through the pin 37′, extending into the annular groove 16$^{b'}$ in the end 16$^b$ of the drum 16, move the drum to the right from the position shown in Fig. 1 and with the drum the arm 35′, which engages the worm 30. Alongside of the collar 43 is a second collar 45, fast on the shaft 8 and having a cam-groove 45′ therein, into which extends a pin 46′ on a lever 46, centrally pivoted on a stud 47. (See Figs. 4 and 6.) The outer end 46″ of the lever 46 extends in alinement with the sliding rod 11. (See Fig. 6.) In the end of a side extension 44$^a$ on the arm 44 is pivotally mounted on a pin 49′ the upper end of a lever 49. The lower end 49″ of the lever 49 is adapted to extend between the outer end 46″ of the lever 46 and the end of the sliding rod 11, as shown in Fig. 1, when the arm 44 is moved inwardly, so that a longitudinal motion will be communicated to the rod 11 by the lever 46 to cause the pin-wheel 7 to engage the star-wheel 6 and turn the box-chain 5 when the drum 16 is moved to the right. A spring 50, attached to the lever 49 and to the arm 44, acts to hold the end 49″ of the lever 49 against the end 46″ of the lever 46, and a stop or projection 49‴ at the upper end of the lever 49, engaging the extension 44$^a$, limits the movement of the lever 49 and the action of the spring 50. When the arm 44 is in its outer position, the lever 49 will be held out of the path of the lever 46 and the sliding rod 11, so that the lever 46 will not move the rod 11.

In Figs. 9 and 10 are shown the gearing for driving the shaft 3 and for driving the pinion 9 on said shaft. The outer end of the shaft 3 is mounted in bearings on the outer dobby-frame 51 and has fast thereon a gear 52, driven by some suitable gearing (not shown) in the ordinary way. The gear 52 meshes with a gear 53, fast on the end of a shaft 54, mounted in suitable bearings on the dobby-frame. The inner end of the shaft 54 has a pinion 55 fast thereon, which meshes with a gear 56, loose on a stud 57. The gear 56 meshes with and operates the gear 9, fast on the shaft 8. (See Fig. 10.) The rotation of the shaft 8 also rotates the pin-wheels 7 and 19, splined thereon, and causes them to operate the star-wheels 6 and 18 when moved into engagement therewith. The star-wheel 6 is secured to an extension on the hub of the box pattern-chain cylinder 4, which is loose on the shaft 3. The star-wheel 18, with the gear 28 thereon, is secured to the sleeve 17, which is loose on the shaft 3. (See Fig. 9.) The pattern-drum 16 is splined on the sleeve 17 to rotate therewith and move longitudinally thereon. The gear 28 on the star-wheel 18 meshes with the gear 29, fast on the worm 30, which is loose on the shaft 8. The worm 30 is prevented from having a longitudinal motion on said shaft—in this instance by a screw 30′ extending into a groove 8′ in the shaft 8. (See Fig. 9.)

The operation of my improvements will be readily understood by those skilled in the art.

In starting a pattern the drum 16 will be at the right-hand end of the shaft 17, as shown in Fig. 2. The holes in the drum 16 for the pattern-pins 16′ are on a curved line, forming a helix. Through the arm 35′ on the ring 35 in the annular groove at the end of the drum 16, engaging with the thread of the worm 30, as shown in Fig. 3, said worm having a rotary motion, the arm 35′ is gradually moved to the left and moves the drum 16 with it on the shaft 17. As the drum 16 is thus moved to the left and having at the same time a rotary motion each hole in the drum is brought under the curved surface 15′ of the lever 15. (See Fig. 6.) Whenever it is desired to start the pattern-chain, a pattern-pin 16′ will be inserted in the drum at the particular point where it is desired to start the pattern-chain, and when there is no pin to raise the lever 15 the pattern-chain will remain at rest; but as soon as a pattern-pin comes under the lever 15 to engage the surface 15′ thereon the lever 15 is raised, and through connecting mechanism the pattern-chain is started. This operation is continued until one pattern is completed. Then it is necessary to repeat the operation, and the drum 16 is carried to the right, which is accomplished as follows: The rocking arm 36 is so adjusted that the ordinary length of pattern-pins 16′ for operating the lever 15 will not touch the arm 36, and a longer pin 16$^a$ is used to operate said arm (see Fig. 6) and rock the shaft 31 and the arm 33, which is fast thereon, and through connector 34 move the arm 35′ out of engagement with the threads of the worm 30. At the same time the pin 42 in the hub 40‴ of the lever 40 is pushed into a cam-groove 43' in the cam 43, which has a rotary motion, and through the pin 42 and levers 40 and 37 the drum 16 is moved to its extreme position on the right, as shown in Fig. 2, for the repetition of the pattern.

It will be understood that the details of construction of my improvements may be varied, if desired.

Having thus described my invention, what I claim as new, and desire to secure by Letters Patent, is—

1. In a loom, a shuttle-box pattern-chain, a multiplier pattern-drum, a rotary worm, connections intermediate said drum and worm, to communicate a longitudinal motion in one direction to said drum, mechanism for moving the drum in the other direction, and connections intermediate the box pattern-chain and the pattern-drum.

2. In a loom-multiplier mechanism, a pattern-drum, a worm, intermediate connections between said drum and worm, to communicate from said worm a longitudinal motion to said drum in one direction, and means for communicating a longitudinal motion to said drum in the other direction, and means for communicating an intermittent rotary motion to said drum.

3. In a loom-multiplier mechanism, a box pattern-chain, a multiplier pattern-drum adapted to have a rotary motion, and also a longitudinal motion, intermediate connections between said chain and drum, means for communicating an intermittent rotary motion to the pattern-chain, means for communicating an intermittent rotary motion to the pattern-drum, and means for communicating a longitudinal motion to the pattern-drum in each direction.

THOMAS P. WALSH.

Witnesses:
   JOHN C. DEWEY,
   MINNA HAAS.